United States Patent
Vinson

(10) Patent No.: US 6,306,543 B1
(45) Date of Patent: Oct. 23, 2001

(54) ELECTRODES AND METHODS OF MAKING THEM

(75) Inventor: John Reginald Vinson, Ness (GB)

(73) Assignee: Pirelli Cables (2000) Limited, London (GB)

(*) Notice: Subject to any disclaimer, the term of this patent is extended or adjusted under 35 U.S.C. 154(b) by 0 days.

(21) Appl. No.: 09/297,033

(22) PCT Filed: Nov. 4, 1997

(86) PCT No.: PCT/GB97/03031

§ 371 Date: May 21, 1999

§ 102(e) Date: May 21, 1999

(87) PCT Pub. No.: WO98/21383

PCT Pub. Date: May 22, 1998

(30) Foreign Application Priority Data

Nov. 8, 1996 (GB) .................................................. 96232863

(51) Int. Cl.$^7$ .............................. H01M 4/66; C23F 13/16
(52) U.S. Cl. ..................................... 429/231.5; 429/218.1; 429/FOR 109; 204/291; 205/109; 252/519.12; 427/561; 427/77; 427/205; 428/46; 428/372
(58) Field of Search ..................................... 428/626, 372, 428/46, 625, 325, 458; 205/109; 429/218.1, 231.5, FOR 109; 204/242, 291; 252/519.12, 520.2; 427/561, 77, 205

(56) References Cited

U.S. PATENT DOCUMENTS

| | | | |
|---|---|---|---|
| 4,422,917 | * 12/1983 | Hayfield | 204/196 |
| 4,971,666 | * 11/1990 | Weinberg et al. | 204/59 |
| 5,173,215 | 12/1992 | Clarke | 429/218 |
| 5,281,496 | * 1/1994 | Clarke | 429/218 |
| 5,521,029 | * 5/1996 | Fiorino et al. | 205/150 |

FOREIGN PATENT DOCUMENTS 0 443 229 A1    8/1991  (EP) .

* cited by examiner

Primary Examiner—Deborah Jones
Assistant Examiner—Stephen Stein
(74) Attorney, Agent, or Firm—Blank Rome Comisky & McCauley LLP

(57) ABSTRACT

An electrode for electrochemical processes comprising an electrically conductive wire having a coating of a polymer having dispersed in it Magneli phase oxide particles, at least half the mass thereof being constituted by particles with diameters in the range 200 to 1000 $\mu$m. This results in a very substantial increase in conductance compared with the conventional use of particles in the approximate range 1–50 $\mu$m.

To avoid breakdown of the rather fragile particles, the energy absorbed in mixing the oxide with the polymer should be restricted to at most 200J/g.

14 Claims, 2 Drawing Sheets

ELECTRODES AND METHODS OF MAKING THEM

This Application is a 35 U.S.C. 371 Application of PCT/GB97/03031 filed Nov. 4, 1997.

This invention related to electrodes for electrochemical processes and to methods of making them. More specifically, it relates to electrodes comprising conductive suboxides of titanium, usually referred to as "Magneli Phase" oxides.

Such conductive oxides have been known for many years, and in bulk form have an electrical conductivity similar to that of graphite. They have found some use as electrodes for processes in which metals are undesirable and graphite is susceptible to oxidation. They would be desirable for use in soil remediation and cathodic protection systems if they could be made into slender, flexible electrodes, and attempts have therefore been made to use them in particulate dispersion in polymeric carriers, for example as coatings on wires.

Magneli phase oxides are normally manufactured as powders with particle sizes in the region of a micrometre and converted to ceramic form by a sintering process, so it was natural to try the effect of dispersing these fine particles in appropriate polymer base; the result was the preparation of a mixture that was virtually insulating, however large the proportion of the oxide.

Clarke U.S. Pat. No. 5,173,215 attributes this to the formation of a resistive film (presumably of titanium dioxide) at the particle surfaces, and notes that this effect would be greater the smaller the particle size; consequently it recommends the use of mixtures that include some particles larger than 50 $\mu$m, apparently meaning from 50 up to about 100$\mu$m. EP0443229, on the other hand, recommends the use of very small particles, in the 1 $\mu$m range.

We have found that using mixtures with particle sizes in the 50–100 $\mu$m range does improve conductivity, but only marginally.

We have now found that electrodes with substantially improved and useful conductances can be made.

In accordance with one aspect of the invention, an electrode for electrochemical processes comprises an electrically conductive wire having a coating of a polymer having dispersed in it Magneli phase oxide particles, characterised in that at least half the mass thereof is constituted by particles with diameters in the range 200 to 1000 $\mu$m.

Preferably the electrically conductive wire is a solid wire of copper, copper-clad steel, or a high-strength copper alloy.

The Magneli phase oxide may be a simple one, or may be doped to increase its conductivity, for example with oxides of niobium, lead or zirconium.

Preferably at least 50% of the mass of the Magneli phase oxide is constituted by particles with diameters in the range 200–750 $\mu$m, or better 250–600 $\mu$m.

Preferably at least 65% of the mass is in the range of particle sizes specified.

Preferably at least 80% of the mass should be constituted by particles with diameters in the range 200–1000 $\mu$m.

The main factors affecting the choice of polymer base for the coating are resistance to swelling or other degradation in the soil water or other electrolyte to which the electrode is to be exposed and the need to accept a sufficient loading of the Magneli phase oxide without loss of sufficient flexibility. Comparatively rubbery polymers will often be preferred. Suitable polymers for consideration include ethylene copolymers such as EVA's, EPR's, EPDM's, ethylene-octene copolymers, chlorinated or chlorosulfonated polyethylene and fluoroelastomers such as the one sold by DuPont under the trademark VITON. Polyethylenes, especially the low-density ones with elastomeric characteristics, may be suitable in some cases.

The thickness of the coating on the wire will vary, depending largely upon the sizes of the larger of the Magneli phase oxide particles. The maximum thickness will usually be limited by consideration of the conductance required of the coating, and will usually be in the region of 1 mm; the minimum thickness will be set by the need to ensure that the coating is substantially free from pinhole defects, and will usually be in the region of 0.3 mm or larger.

Large particles of Magneli phase oxides are in the nature of relatively fragile agglomerates. In making the electrodes described, care needs to be taken that the Magneli phase oxide is dispersed in the polymer without reducing the sizes of the particles to the extent that they no longer meet the requirements specified.

In accordance with another aspect of the invention, a method for making an electrode comprises the steps of (a) dispersing particles of a Magneli phase titanium oxide in a polymer to form a mixture and (b) coating the said mixture on a metal wire and is characterised in that at least half the mass of the oxide particles is constituted by particles with diameters in the range 200 to 1000 $\mu$m and the total energy absorbed by the said mixture in step 1 is not greater than 200J/g.

Preferably the said energy absorbed is not greater than 150J/g

Preferably mixing is effected by low-shear mixer, such as a Banbury mixer or mixer of the type sold under the trademark BUSS as a BUSS Co-Kneader.

Preferably the polymer is preheated to an appropriate temperature before the introduction of the oxide, rather than relying on shear heating during mixing for any substantial part of the temperature rise. If necessary to achieve a low enough viscosity to enable the limitation on energy absorption to be achieved, the temperature can be raised to any level up that at which risk of degradation arises.

Extrusion is preferably effected by an extruder with a low compression-ratio screw.

BRIEF DESCRIPTION OF THE DRAWINGS

The invention will be further described, by way of example, with reference to the accompanying drawings in which:

FIG. 1 plots particle-size distribution for the sample expressed as the weight percentage below the particle size plotted, from which it can be deduced that about 90% of the sample had particle diameters in the range 200–1000 $\mu$m; 89% in the range 200–750 $\mu$m and 69% in the range 250–600 $\mu$m. This sample was dispersed in an ethylene-octene copolymer (sold under the trademark ENGAGE as Engage 8401) by first fluxing the polymer at a temperature of 170° C. in a Banbury mixer and then adding the oxide at the rate of 85 parts per hundred parts of polymer (by weight) in three equal portions at 1 minute intervals and then continuing mixing for only about 2 mins more, the energy absorbed during mixing being about 130J/g. The hot mixture was immediately pressed into sheet form and granulated. It was then fed to a 30 mm 25 l/D extruder with a screw having a compression ratio of about 1.5:1 with a gradual transition. The extruder formed the mixture into a substantially non-porous coating 0.75 mm thick on a plain round copper wire with a diameter of 1.0 mm to form a flexible wire-form electrode suitable for use in soil remediation operations.

FIG. 2 shows the results of a series of experiments in which the same Magneli phase oxide as described by the particle-size distribution of FIG. 1 was blended with the same ethylene-octene polymer in the same proportion, using broadly the same mixing procedure but varying the temperature and time of mixing to demonstrate the effect of differing energy absorption. To facilitate conductivity measurements, these samples were not extruded onto wire but were press-moulded into plaques without substantial amounts of mechanical energy being absorbed. The Figure shows the conductivity of these plaques as a function of the energy absorbed per unit mass of the mixture, and the following Table gives further details:

TABLE

Figure 1:
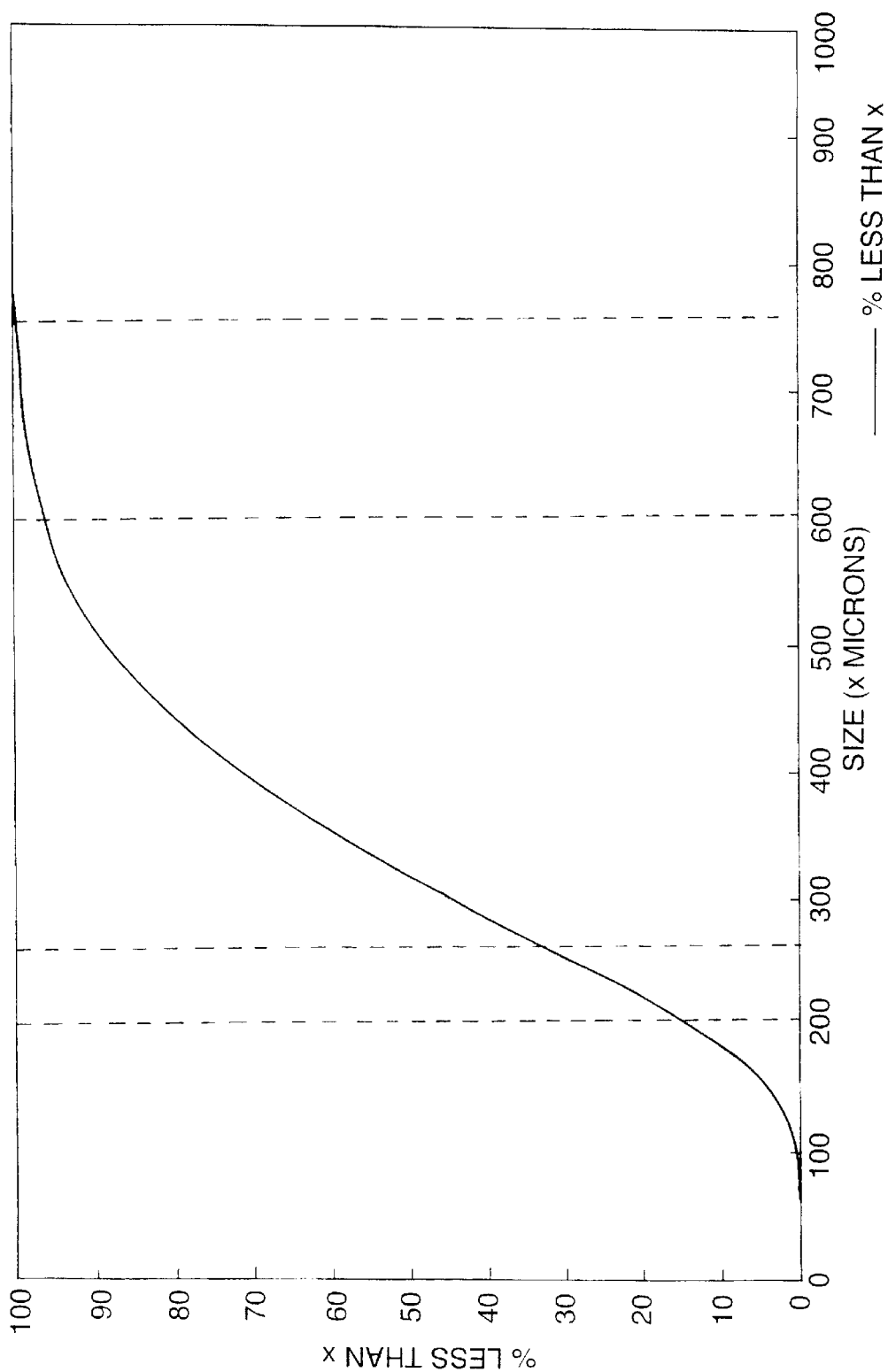
FIG. 1 is a graph of the particle-size distribution of a sample of Magneli phase oxide used in making an electrode in accordance with the invention and FIG. 2 is a graph of conductivity vs absorbed energy for certain experimental samples related to the invention.
Figure 2:
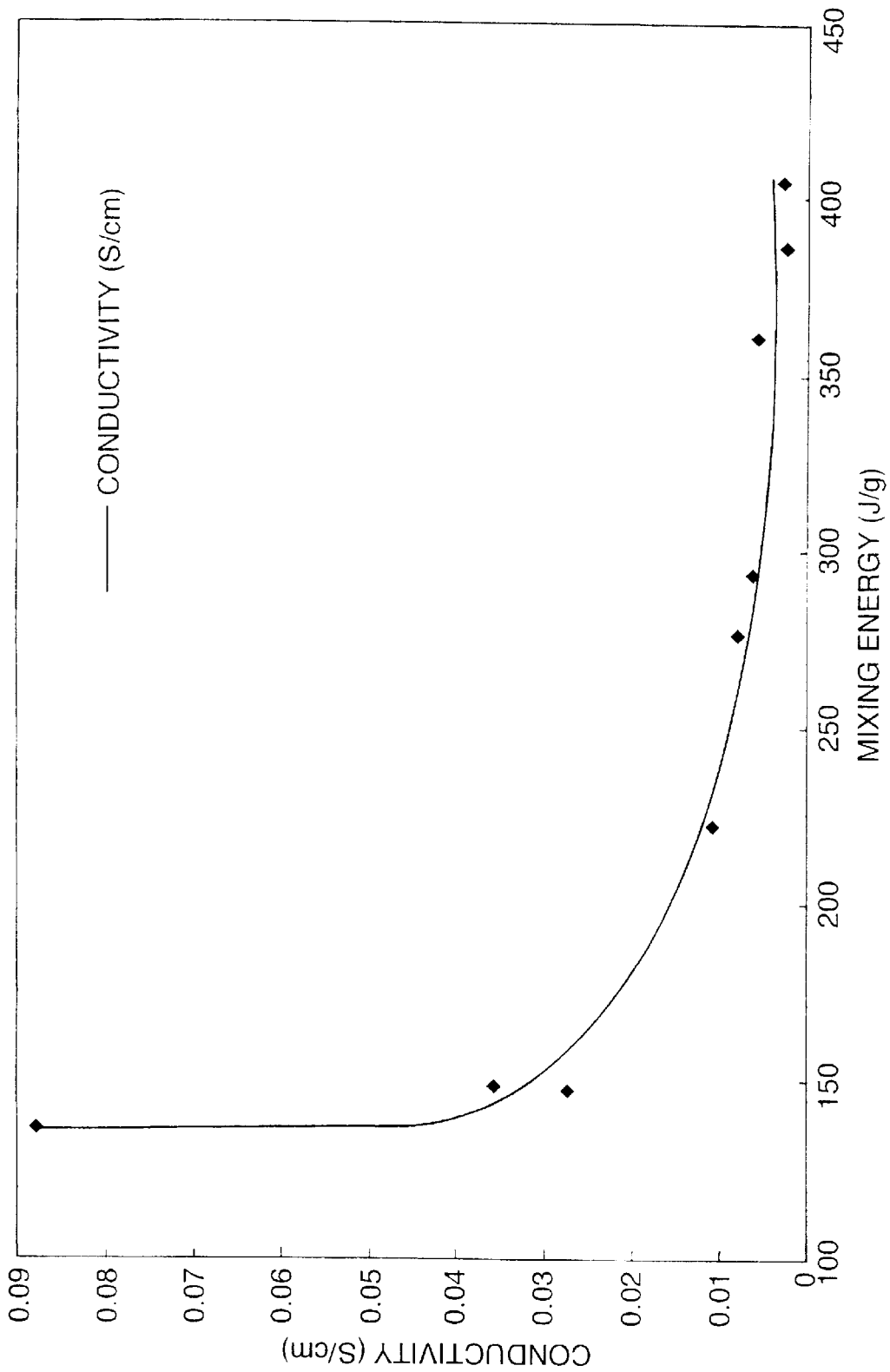

| Run | temp. (° C.) | mix time (min) | energy (J/g) | conductivity (× $10^{-3}$ S/cm) |
|---|---|---|---|---|
| 1 | 140 | 6 | 224 | 9.8 |
| 2 | 155 | 6 | 148 | 26.3 |
| 3 | 170 | 6 | 139 | 87.7 |
| 4 | 140 | 9 | 295 | 4.48 |
| 5 | 155 | 9 | 277 | 6.06 |
| 6 | 170 | 9 | 149 | 3.45 |
| 7 | 140 | 12 | 407 | 1.38 |
| 8 | 155 | 12 | 389 | 4.63 |
| 9 | 170 | 12 | 363 | 1.73 |

What is claimed is:

1. An electrode for electrochemical processes comprising an electrically conductive wire including a coating of a polymer having dispersed in the polymer, magneli phase oxide particles, wherein at least half the mass thereof is comprised by particles with diameters in the range of 200 to 1000 μm.

2. An electrode as claimed in claim 1 in which the electrically conductive wire is a solid wire comprising at least one of copper, copper-clad steel or high strength copper alloy.

3. An electrode as claimed in claim 1 in which the Magneli phase oxide is doped to increase its conductivity.

4. An electrode as claimed in claim 1 in which at least 50% of the mass of Magneli phase oxide is constituted by particles with diameters in the range of 200–750 μm.

5. An electrode as claimed in claim 1 in which at least 50% of the mass of Magneli phase oxide is constituted by particles with diameters in the range of 250–600 μm.

6. An electrodes as claimed in claim 1 in which at least 65% of the mass of the Magneli phase oxide is in the range of particle sizes specified.

7. An electrode as claimed in claim 1 in which at least 80% of the mass of Magneli phase oxide is comprised of particles with diameters in the range of 200–1000 μm.

8. An electrode as claimed in claim 7 in which the polymer is an ethylene copolymer selected from the group consisting of EVA's, EPR's EPDM's, ethylene-octene copolymers, chlorinated or chlorosulfonated polyethylene, fluroelastomers and polyethylene.

9. An electrode as claimed in claim 1 in which the thickness of the coating on the wire is less than about 1 mm.

10. An electrode as claimed in claim 1 in which the thickness of the coating on the wire is 0.3 mm or larger.

11. A method for making an electrode comprises the steps of
    (a) dispersing particles of a Magneli phase titanium oxide in a polymer to form a mixture and
    (b) coating the said mixture on a metal wire and wherein at least half the mass of the oxide particles is comprised of particles with diameters in the range 200 to 1000 μm and the total energy absorbed by the said mixture in step (a) is not greater than 200J/g.

12. A method as claimed in claim 11 in which the said energy absorbed is not greater than 150J/g.

13. A method of making an electrode as claimed in claim 11, in which the step of dispersing comprises mixing which is effected by a low shear-mixer.

14. A method as claimed in claim 1 in which the polymer is preheated to a lower viscosity temperature before the introduction of the oxide.

* * * * *